United States Patent
Tanaka

(10) Patent No.: US 9,804,061 B2
(45) Date of Patent: Oct. 31, 2017

(54) METHOD AND DEVICE FOR TESTING WATER DROPLET SHEDDING ABILITY OF AIRCRAFT WING

(71) Applicant: SUBARU CORPORATION, Tokyo (JP)

(72) Inventor: Taro Tanaka, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/061,346

(22) Filed: Mar. 4, 2016

(65) Prior Publication Data
US 2016/0258843 A1    Sep. 8, 2016

(30) Foreign Application Priority Data
Mar. 5, 2015 (JP) ................... 2015-043044

(51) Int. Cl.
*G01M 9/02* (2006.01)
*G01M 9/06* (2006.01)
(Continued)

(52) U.S. Cl.
CPC ............ *G01M 99/00* (2013.01); *B64D 15/00* (2013.01); *B64D 15/20* (2013.01); *G01M 9/02* (2013.01);
(Continued)

(58) Field of Classification Search
CPC .......... B64D 15/00; B64D 15/20; C09K 3/18; B64C 3/28; B64C 3/50; B64C 2230/26;
(Continued)

(56) References Cited

U.S. PATENT DOCUMENTS

| 4,188,823 A * | 2/1980 | Hood ............... G01M 9/06 73/147 |
| 4,526,031 A * | 7/1985 | Weisend, Jr. .......... B64D 15/20 428/354 |

(Continued)

FOREIGN PATENT DOCUMENTS

| JP | 04-070535 A | 3/1992 |
| JP | 2005-127892 A | 5/2005 |

(Continued)

OTHER PUBLICATIONS

T. Kojima et al., "A note on the effectiveness of surface coating for thermal icing prevention," Japanese Society of Snow and Ice/Japan Society for Snow Engineering, Tokyo, Japan, Sep. 5, 2008, vol. 2008, p. 199,with English translation.
(Continued)

*Primary Examiner* — Randy Gibson
*Assistant Examiner* — Gedeon M Kidanu
(74) *Attorney, Agent, or Firm* — McDermott Will & Emery LLP

(57) ABSTRACT

A method for testing water droplet shedding ability of a surface of an aircraft wing includes: blowing air toward a surface of a cylindrical member in an airflow direction perpendicular to an axial direction of the cylindrical member, the cylindrical member simulating the wing and having water-related surface characteristics that differ across a predetermined boundary position in a circumferential direction; supplying a water droplet to a portion of the surface of the cylindrical member on a leading edge side with respect to a flow of the air; and capturing an image of the water droplet that moves on the surface of the cylindrical member across the boundary position due to the flow of the air.

15 Claims, 2 Drawing Sheets

(51) Int. Cl.
  *B64D 15/20* (2006.01)
  *G01M 99/00* (2011.01)
  *B64D 15/00* (2006.01)
  *G09B 25/00* (2006.01)

(52) U.S. Cl.
  CPC .............. *G01M 9/06* (2013.01); *G01M 9/067* (2013.01); *G09B 25/00* (2013.01)

(58) Field of Classification Search
  CPC ................ B64C 3/36; B64C 2003/146; B64C 2003/147; B64C 2003/148; B64C 21/04; B64C 21/10; G03F 7/004; F05B 2280/6011; G01M 99/00; G01M 9/00; G01M 9/02; G01M 9/04; G01M 9/06; G01M 9/062; G01M 9/065; G01M 9/067; G01M 9/08; G09B 9/16; Y02B 10/30; G01N 11/02; G01N 2011/006; G01N 13/00
  USPC .................................................. 73/118.3, 147
  See application file for complete search history.

(56) References Cited

U.S. PATENT DOCUMENTS

| | | | | |
|---|---|---|---|---|
| 4,751,844 A | * | 6/1988 | Matsushita | G01M 9/04 73/147 |
| 5,186,046 A | * | 2/1993 | Gouterman | G01M 9/06 374/143 |
| 5,500,530 A | * | 3/1996 | Gregoris | B64F 5/0054 244/134 F |
| 5,589,822 A | * | 12/1996 | Stern | B64D 15/20 340/583 |
| 5,838,239 A | * | 11/1998 | Stern | B64D 15/20 340/583 |
| 5,841,538 A | * | 11/1998 | Schoeffler | B64D 15/20 340/583 |
| 5,921,501 A | * | 7/1999 | Pernick | B64F 5/20 244/134 F |
| 5,921,502 A | * | 7/1999 | Al-Khalil | B64D 15/16 244/134 A |
| 6,377,207 B1 | * | 4/2002 | Solheim | G01W 1/02 324/640 |
| 7,987,707 B2 | * | 8/2011 | Milde | G01M 9/06 73/147 |
| 7,997,130 B1 | * | 8/2011 | Stonner | G01M 9/04 73/147 |
| 8,783,337 B2 | * | 7/2014 | Hyde | B63B 1/34 165/11.1 |
| 9,199,741 B2 | * | 12/2015 | Sapper | C09K 3/18 |
| 2012/0049002 A1 | | 3/2012 | Wood | |
| 2013/0180325 A1 | * | 7/2013 | Spandl | G01N 15/02 73/147 |

FOREIGN PATENT DOCUMENTS

| | | | | |
|---|---|---|---|---|
| JP | 2008-014879 A | | 1/2008 | |
| JP | 2010-234989 A | | 10/2010 | |
| JP | 2010234989 A | * | 10/2010 | ............ B64D 15/00 |
| JP | 2012-103041 A | | 5/2012 | |
| JP | 2013-190426 A | | 9/2013 | |

OTHER PUBLICATIONS

Search Report EP Application No. 16 15 8003.0 dated Aug. 19, 2016.

* cited by examiner

METHOD AND DEVICE FOR TESTING WATER DROPLET SHEDDING ABILITY OF AIRCRAFT WING

CROSS REFERENCES TO RELATED APPLICATIONS

The present invention contains subject matter related to Japanese Patent Application No. 2015-043044 filed in the Japan Patent Office on Mar. 5, 2015, the entire contents of which are incorporated herein by reference.

BACKGROUND

1. Technical Field

The present invention relates to a method and a device for testing the water droplet shedding ability of a surface of an aircraft wing.

2. Related Art

In aviation, it is known that an ice layer may form on a wing surface when supercooled water droplets in a cloud collide with the wing surface and that icing on the wing surface may cause problems, such as decreased flight performance.

At present, a method using bleed air is one of mainstream icing prevention methods. Recently, however, a method of melting ice by heating a leading edge of a wing with an electrothermal heater, which is more fuel-efficient than the bleed-air method, has been increasingly used. However, with this method, water droplets, which are formed when ice is heated and melted, may refreeze and adhere to the wing surface after moving on the wing surface and having passed the leading edge (heated region) of the wing.

Japanese Unexamined Patent Application Publication (JP-A) 2010-234989 describes a technology in which the surface of a leading edge of a wing is a non-hydrophobic region, which is heated from the inside by using an electrothermal heater, and the surface of the remaining portion of the wing is a super-hydrophobic region. With this technology, water droplets, which are formed when ice is heated and melted at the leading edge of the wing, are shed (removed) from the wing surface due to an airflow pressure after moving on the wing surface and reaching the super-hydrophobic region.

The cross-sectional shape of an aircraft wing differs between types of aircrafts or parts of the wing.

Therefore, to evaluate an icing preventing effect of the technology described in JP-A No. 2010-234989 (that is, the water droplet shedding ability of a wing surface), it is necessary to make a wing structure that accurately simulates a wing for each of aircrafts of interest. Accordingly, it is necessary to carry out a large-scale test, including preparation.

SUMMARY OF THE INVENTION

An object of the present invention, which has been devised to solve the aforementioned problems, is to facilitate the evaluation of the water droplet shedding ability of a surface of an aircraft wing.

A first aspect of the present invention provides a method for testing water droplet shedding ability of a surface of an aircraft wing. The method includes blowing air toward a surface of a cylindrical member in an airflow direction perpendicular to an axial direction of the cylindrical member, the cylindrical member simulating the wing and having water-related surface characteristics that differ across a predetermined boundary position in a circumferential direction; supplying a water droplet to a portion of the surface of the cylindrical member on a leading edge side with respect to a flow of the air; and capturing an image of the water droplet that moves on the surface of the cylindrical member across the boundary position due to the flow of the air.

Preferably, a region of the surface of the cylindrical member on a leading edge side of the boundary position is a non-hydrophobic region and a region of the surface of the cylindrical member on a trailing edge side of the boundary position is a hydrophobic region.

Preferably, the cylindrical member simulates an aircraft wing that has characteristics that differ between a leading edge side and a trailing edge side across a predetermined boundary position; and the cylindrical member has a radius that is substantially equal to a radius of curvature of the wing at the boundary position, and a central angle between a line passing through the boundary position of the cylindrical member and the airflow direction is substantially equal to an angle between a line perpendicular to the wing at the boundary position of the wing and a direction of a flow of air.

Preferably, an ambient temperature of the cylindrical member is room temperature.

A second aspect of the present invention provides a device for testing water droplet shedding ability of a surface of an aircraft wing. The device includes a cylindrical member that simulates the wing and has water-related surface characteristics that differ across a predetermined boundary position in a circumferential direction; a blower that blows air toward a surface of the cylindrical member in an airflow direction perpendicular to an axial direction of the cylindrical member; a water droplet supply that supplies a water droplet to a portion of the surface of the cylindrical member on a leading edge side with respect to a flow of the air; and an image capturer that captures an image of the water droplet that moves on the surface of the cylindrical member across the boundary position due to the flow of the air.

DETAILED DESCRIPTION

Hereinafter, an example (implementation) of the present invention will be described with reference to the drawings.

First, the structure of a device 1 for testing the water droplet shedding ability of a surface of an aircraft wing (hereinafter, simply referred to as "the water droplet shedding ability testing device 1") according to the present example will be described.

Figure 1:
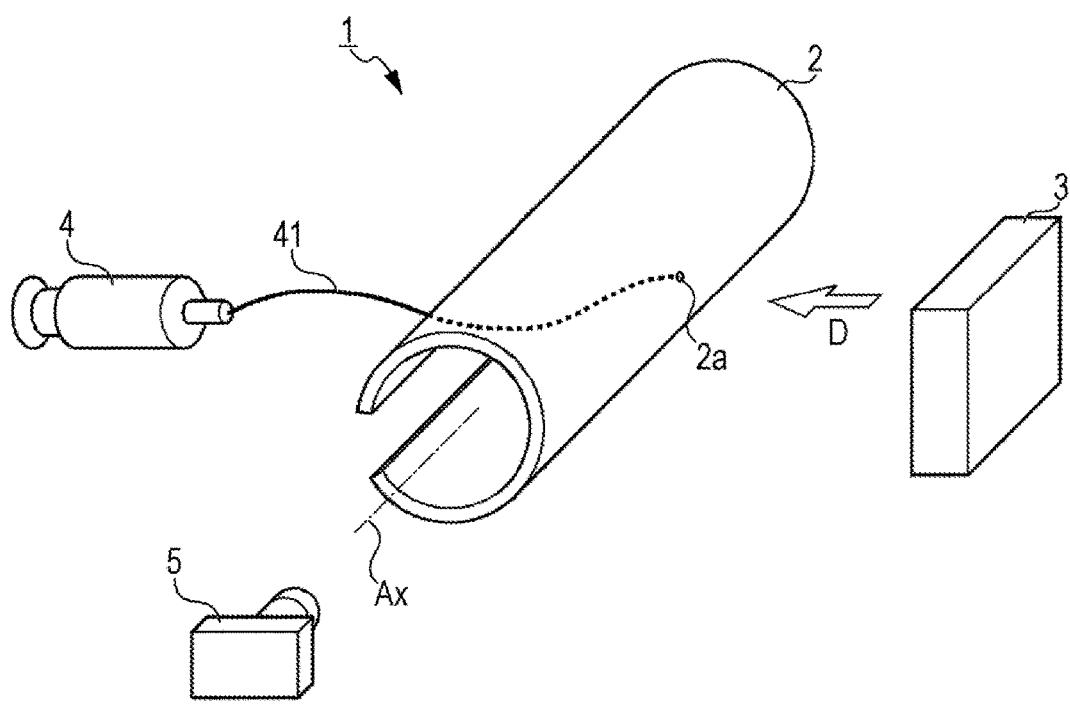
FIG. 1 is a schematic view of a water droplet shedding ability testing device.
Figure 2:
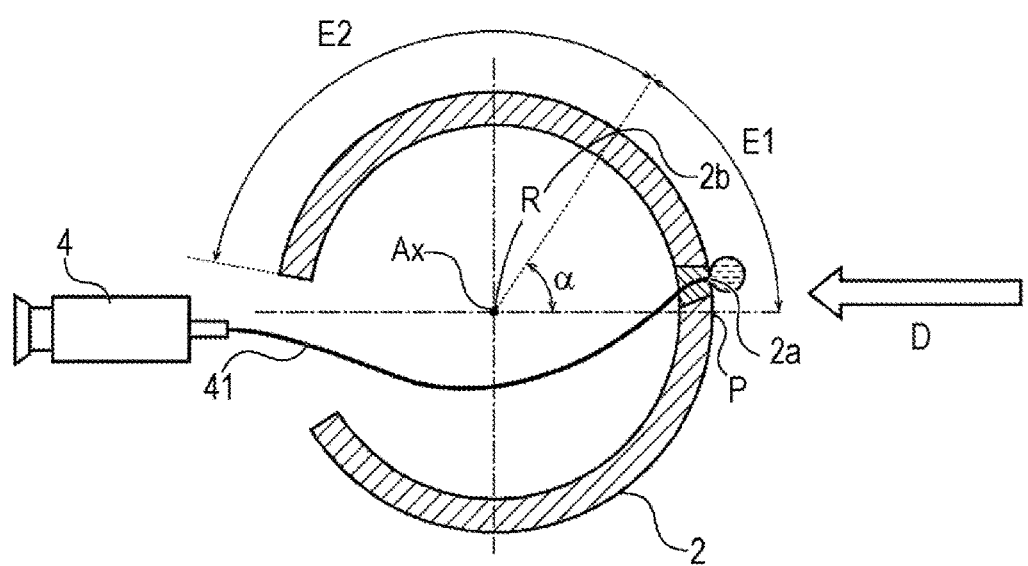
FIG. 2 illustrates the surface conditions of a cylindrical member.
Figure 3:
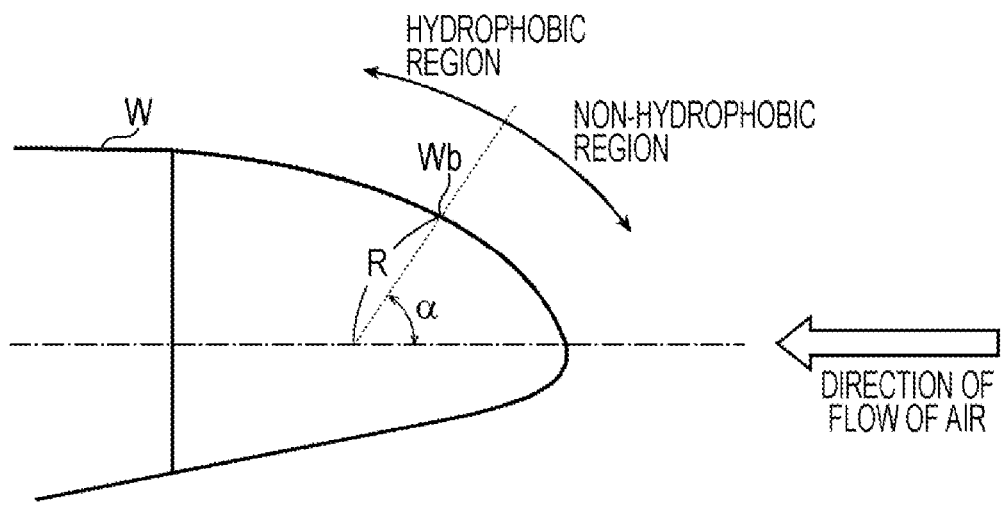
FIG. 3 is a side view of a leading edge and the surrounding region of an aircraft wing that is simulated by the cylindrical member.

FIG. 1 is a schematic view of the water droplet shedding ability testing device 1. FIG. 2 illustrates the surface conditions of a cylindrical member 2 (which will be described below) included in the water droplet shedding ability testing device 1. FIG. 3 is a side view of a leading edge and the surrounding region of an aircraft wing W that is simulated by the cylindrical member 2.

The water droplet shedding ability testing device 1 is used to evaluate the water droplet shedding ability of a surface of an aircraft wing (the ease of shedding a water droplet from the surface). In the present example, the water droplet shedding ability testing device 1 is particularly used to evaluate water droplet shedding ability due to the hydrophobicity of the wing surface.

To be specific, as illustrated in FIG. 1, the water droplet shedding ability testing device 1 includes the cylindrical member 2, a blower 3, a water supply cylinder 4, and a camera 5. The cylindrical member 2 simply simulates an aircraft wing W (in the present example, a main wing; see FIG. 3).

The blower 3 is used to simulate the flow of air toward the aircraft wing W. The blower 3 can blow air toward the surface of the cylindrical member 2 in a direction D (hereinafter, referred to as "the airflow direction D") that is substantially perpendicular to a direction in which the axis Ax of the cylindrical member 2 extends (hereinafter, referred to as "the axial direction").

Preferably, a water droplet shedding ability test according the present example is performed in a wind tunnel facility. Preferably, the blower 3 is installed in the wind tunnel facility.

The water supply cylinder 4 is used to supply water (water droplet) to the surface of the cylindrical member 2. The water supply cylinder 4 is connected to the cylindrical member 2 through a tube 41 so that water can be supplied to the cylindrical member 2. To be specific, one end of the tube 41 is connected with an open end of the water supply cylinder 4. The other end of the tube 41 is connected, from the inside of the cylindrical member 2, with a position on the surface of the cylindrical member 2 adjacent to a stagnation point P (see FIG. 2) in the airflow direction D.

The position (that is, a water supply position 2a) in the surface of the cylindrical member 2 with which the other end of the tube 41 is connected is not particularly limited, as long as the water supply position 2a is located on the leading edge side of a boundary position 2b (described below) with respect to the airflow direction D. Preferably, however, the water supply position 2a is located on either side of the stagnation point P in the circumferential direction so that the water droplet shedding ability can be evaluated by using only a substantially semicylindrical portion of the cylindrical member 2. In the present example, the water supply position 2a is located slightly above the stagnation point P (see FIG. 2).

The camera 5 is used to capture an image of water (water droplet) that moves on the surface of the cylindrical member 2. In the present example, the camera 5 is disposed so that the camera 5 can capture an image of the surface of the cylindrical member 2 in a direction substantially the same as the axial direction. The camera 5 is a high speed camera that can capture still images or video images representing the behavior of water (water droplet) that moves on the surface of the cylindrical member 2 due to the flow of air from the blower 3.

The direction and the position of the camera 5 are not particularly limited, as long as the camera 5 can capture an image of water (water droplet) that moves on the surface of the cylindrical member 2.

As described above, the cylindrical member 2 simply simulates the aircraft wing W. The cylindrical member 2 is made of the same material as the wing W, such as an aluminum alloy or a composite material. The cylindrical member 2 is disposed so that the axis Ax extends substantially horizontally. Although not particularly limited, a portion of the cylindrical member 2 on a side opposite to a side facing against the airflow direction D (on the left side in FIG. 2) is cut off so that the tube 41 can be inserted into the cylindrical member 2.

As illustrated in FIG. 3, in the wing W simulated by the cylindrical member 2, a region of the surface of the wing W on the leading edge side of the boundary position Wb is a non-hydrophobic region, and a region of the surface of the wing W on the trailing edge side the boundary position Wb is a hydrophobic region. The cylindrical member 2 particularly simulates the surface conditions of the wing W.

To be specific, as illustrated in FIG. 2, in the cylindrical member 2, the leading edge side of the boundary position 2b with respect to the airflow direction D is a non-hydrophobic region E1, and the trailing edge side of the boundary position 2b is a hydrophobic region E2. The boundary position 2b corresponds to the boundary position Wb of the wing W. That is, the cylindrical member 2 has a radius (circumradius) R that is substantially equal to the radius of curvature of the wing W at the boundary position Wb. Moreover, the central angle between a line passing through the boundary position 2b and the airflow direction D is an angle α, which is substantially equal to an angle between a line perpendicular to the wing W at the boundary position Wb and the direction of the flow of air.

The surface of the cylindrical member 2 in the non-hydrophobic region E1, which is on the leading edge side, is a bare surface of a non-hydrophobic base material (or a surface coated with a non-hydrophobic paint). The surface of the cylindrical member 2 in the hydrophobic region E2, which is on the trailing edge side, is a surface coated with a hydrophobic paint over a predetermined length in the axial direction. The water supply position 2a is included in the non-hydrophobic region E1.

In the present example, because the water droplet shedding ability is evaluated by using only an upper half (a substantially semicylindrical upper portion) of the cylindrical member 2, the non-hydrophobic region E1 and the hydrophobic region E2 are formed only on the upper half.

Next, a method for testing water droplet shedding ability according to the present example will be described.

In the present example, a tester performs a test by operating various parts of the water droplet shedding ability testing device 1.

In a water droplet shedding ability test performed by using the method according to the present example, it is assumed that the temperature of the non-hydrophobic region of the surface of the actual wing W is maintained at 0° C. or higher by a heater and that the ambient temperature of the cylindrical member 2 is room temperature. That is, temperature control is not performed. Note that the ambient temperature need not be room temperature, as long as the ambient temperature is within the range of the temperature of the surface of the non-hydrophobic region of the actual wing W, which is maintained by a heater in an icing environment.

Next, as illustrated in FIG. 2, the blower 3 is operated to blow air toward the surface of the cylindrical member 2 in the airflow direction D. At this time, the blower 3 blows air with such a power as to simulate an airflow pressure that the wing W receives under actual flight conditions.

Next, the water supply cylinder 4 is operated to discharge water (water droplet) from the water supply position 2a of the cylindrical member 2.

Then, a water droplet, which is discharged to the surface of the cylindrical member 2 from the water supply position 2a slightly above the stagnation point P, moves on the surface from the non-hydrophobic region E1 to the hydrophobic region E2 across the boundary position 2b due to the flow of air in the airflow direction D.

Thus, a movement of the water droplet that moves on the surface of the actual wing W from the non-hydrophobic region to the hydrophobic region is simulated.

Next, the camera 5 is operated to successively capture the images of the movement of the water droplet on the surface of the cylindrical member 2 from the non-hydrophobic region E1 to the hydrophobic region E2.

Figure 4:
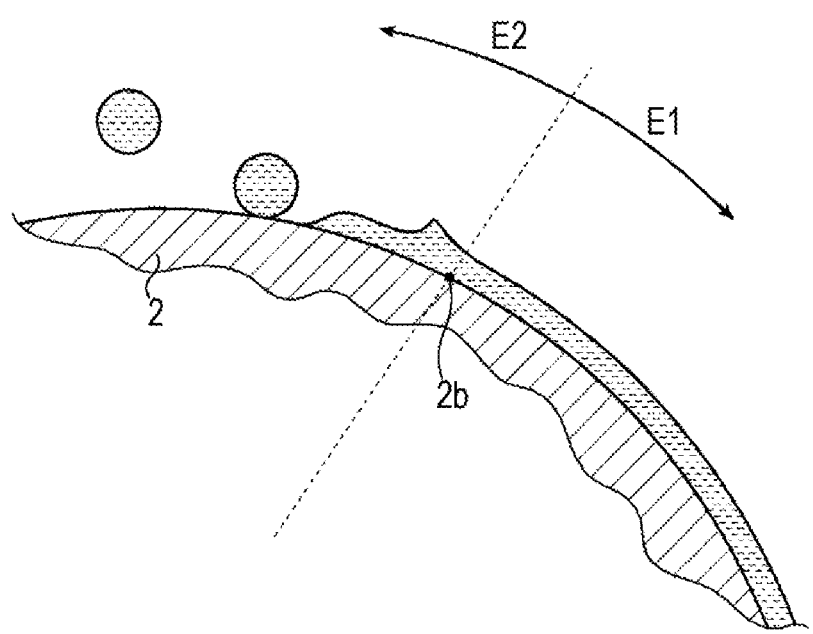
FIG. 4 illustrates an example of the behavior of water droplets that are being shed from the cylindrical member.

Thus, for example, as illustrated in FIG. 4, it is possible to observe the behavior of the water droplet, which is being shed from the surface in a direction toward the trailing edge after moving on the surface of the cylindrical member 2 from the non-hydrophobic region E1 to the hydrophobic region E2.

As a result, it is possible to evaluate the water droplet shedding ability of the surface of the wing W, which is simulated by the cylindrical member 2. That is, it is possible to evaluate the water droplet shedding effect due to the hydrophobic structure of the wing W by determining whether a water droplet can be shed and removed from a portion of the wing W near the boundary position Wb.

To evaluate the water droplet shedding ability when the surface conditions of the wing W or the flight conditions are changed, the test can be performed in the same way as described above while changing, as necessary, the location of the boundary position 2b of the cylindrical member 2, the angle of contact in the hydrophobic region E2 (that is, the type of hydrophobic paint), the air speed, and the like.

As described above, with the present example, air is blown toward the surface of the cylindrical member 2, which has hydrophobicity that differs across the boundary position 2b in the circumferential direction, in the airflow direction D perpendicular to the axial direction of the cylindrical member 2; and a water droplet is supplied to a portion of the surface of the cylindrical member 2 adjacent to the leading edge. An image of the water droplet that moves on the surface of the cylindrical member 2 across the boundary position 2b due to the flow of the air is captured.

Thus, by moving a water droplet from the non-hydrophobic region E1 to the hydrophobic region E2 of the surface of the cylindrical member 2 simulating the aircraft wing W, the regions E1 and E2 having different hydrophobicities, it is possible to observe the behavior of the water droplet when it is shed from the surface and further it is possible to evaluate the water droplet shedding ability of the surface.

Accordingly, it is not necessary to make a wing structure that accurately simulates an aircraft wing, and it is possible to easily evaluate the water droplet shedding ability of the surface of the aircraft wing W by using simple testing devices, such as the cylindrical member 2 having a simple shape.

Because the test can be performed while leaving the ambient temperature of the cylindrical member 2 to be at room temperature, it is possible to easily evaluate the water droplet shedding ability of the surface of an aircraft wing W without using a temperature adjusting device, such as a heater.

Examples to which the present invention can be applied are not limited to the example described above, which can be modified as necessary within the sprit and scope of the present invention.

For example, in the example described above, the water droplet shedding ability of the surface of the cylindrical member 2 (the wing W) due to the hydrophobicity of the surface is evaluated. However, an example of the present invention can be used to evaluate, in addition to hydrophobicity, any water-related surface characteristics, such as water sliding ability.

The cylindrical member 2 needs to have only a portion on which a water droplet moves. Therefore, for example, the cylindrical member 2 may have only a substantially semi-cylindrical upper portion.

In the example described above, a tester operates various parts of the water droplet shedding ability testing device 1. However, a control device, which is connected to various parts of the water droplet shedding ability testing device 1, may be used to perform centralized control of these parts.

The invention claimed is:

1. A method for testing water droplet shedding ability of a surface of an aircraft wing, the method comprising:
    blowing air from a blower toward a surface of a cylindrical member in an airflow direction perpendicular to an axial direction of the cylindrical member, the cylindrical member simulating the wing and having water-related surface characteristics that differ across a predetermined boundary position in a circumferential direction;
    supplying a water droplet from an inner side of the cylindrical member to a portion of the surface of the cylindrical member on a leading edge side with respect to a flow of the air; and
    capturing an image indicating behavior of the water droplet that moves on the surface of the cylindrical member across the boundary position due to the flow of the air.

2. The method according to claim 1, wherein an ambient temperature of the cylindrical member is room temperature.

3. The method according to claim 1, wherein the method is performed under ambient temperature at 0° C. or higher.

4. The method according to claim 1, wherein the cylindrical member simulates an aircraft wing that has characteristics that differ between a leading edge side and a trailing edge side across the predetermined boundary position, and
    wherein the cylindrical member has a radius that is substantially equal to a radius of curvature of the wing at the boundary position, and a central angle between a line passing through the boundary position of the cylindrical member and the airflow direction is substantially equal to an angle between a line perpendicular to the wing at the boundary position of the wing and a direction of a flow of air.

5. The method according to claim 4, wherein an ambient temperature of the cylindrical member is room temperature.

6. The method according to claim 1, wherein a region of the surface of the cylindrical member on a leading edge side of the boundary position is a non-hydrophobic region and a region of the surface of the cylindrical member on a trailing edge side of the boundary position is a hydrophobic region.

7. The method according to claim 6, wherein an ambient temperature of the cylindrical member is room temperature.

8. The method according to claim 6, wherein the cylindrical member simulates an aircraft wing that has characteristics that differ between a leading edge side and a trailing edge side across the predetermined boundary position, and
    wherein the cylindrical member has a radius that is substantially equal to a radius of curvature of the wing at the boundary position, and a central angle between a line passing through the boundary position of the cylindrical member and the airflow direction is substantially equal to an angle between a line perpendicular to the wing at the boundary position of the wing and a direction of a flow of air.

9. The method according to claim 8, wherein an ambient temperature of the cylindrical member is room temperature.

10. A device for testing water droplet shedding ability of a surface of an aircraft wing, the device comprising:
   a cylindrical member that simulates the wing and has water-related surface characteristics that differ across a predetermined boundary position in a circumferential direction;
   a blower that blows air toward a surface of the cylindrical member in an airflow direction perpendicular to an axial direction of the cylindrical member;
   a water droplet supply that supplies a water droplet from an inner side of the cylindrical member to a portion of the surface of the cylindrical member on a leading edge side with respect to a flow of the air; and
   an image capturer that captures an image indicating behavior of the water droplet that moves on the surface of the cylindrical member across the boundary position due to the flow of the air.

11. A method for testing water droplet shedding ability of a surface of an aircraft wing, the method comprising:
   blowing air toward a surface of a cylindrical member in an airflow direction perpendicular to an axial direction of the cylindrical member, the cylindrical member simulating the wing and having water-related surface characteristics that differ across a predetermined boundary position in a circumferential direction;
   supplying a water droplet from an inner side of the cylindrical member to a portion of the surface of the cylindrical member on a leading edge side with respect to a flow of the air; and
   capturing an image of the water droplet that moves on the surface of the cylindrical member across the boundary position due to the flow of the air.

12. The method according to claim 11, wherein the cylindrical member simulates an aircraft wing that has characteristics that differ between a leading edge side and a trailing edge side across the predetermined boundary position, and
   wherein the cylindrical member has a radius that is substantially equal to a radius of curvature of the wing at the boundary position, and a central angle between a line passing through the boundary position of the cylindrical member and the airflow direction is substantially equal to an angle between a line perpendicular to the wing at the boundary position of the wing and a direction of a flow of air.

13. The method according to claim 11, wherein an ambient temperature of the cylindrical member is room temperature.

14. The method according to claim 11, wherein a region of the surface of the cylindrical member on a leading edge side of the boundary position is a non-hydrophobic region and a region of the surface of the cylindrical member on a trailing edge side of the boundary position is a hydrophobic region.

15. The method according to claim 14, wherein the cylindrical member simulates an aircraft wing that has characteristics that differ between a leading edge side and a trailing edge side across the predetermined boundary position, and
   wherein the cylindrical member has a radius that is substantially equal to a radius of curvature of the wing at the boundary position, and a central angle between a line passing through the boundary position of the cylindrical member and the airflow direction is substantially equal to an angle between a line perpendicular to the wing at the boundary position of the wing and a direction of a flow of air.

* * * * *